United States Patent
Northrop et al.

(10) Patent No.: US 6,845,735 B1
(45) Date of Patent: Jan. 25, 2005

(54) PET FEEDER

(75) Inventors: Melaney Northrop, Cleburne, TX (US); Scott A. Skurdalsvold, Arlington, TX (US); Mike Harper, Fort Worth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 10/294,733

(22) Filed: Nov. 15, 2002

(51) Int. Cl.[7] ............................................. A01K 61/02
(52) U.S. Cl. ..................................... 119/52.1; 222/410
(58) Field of Search .......................... 119/51.5, 57.1, 119/57.4, 52.1, 902, 53.5, 54; 222/410, 412, 457, 333

(56) References Cited

U.S. PATENT DOCUMENTS

| | | |
|---|---|---|
| 1,276,087 A | 8/1918 | Lilley |
| 3,566,843 A | 3/1971 | Huis |
| 3,587,530 A | 6/1971 | Blair |
| 3,613,641 A * | 10/1971 | Geerlings ................ 119/51.11 |
| 3,720,184 A * | 3/1973 | Pearce ....................... 119/51.5 |
| 3,800,745 A | 4/1974 | Fassauer |
| 3,920,224 A | 11/1975 | Fassauer |
| 3,962,997 A | 6/1976 | Ruth |
| 4,050,415 A * | 9/1977 | Conger ...................... 119/51.5 |
| 4,355,598 A * | 10/1982 | Saylor ...................... 119/52.1 |
| 4,513,688 A * | 4/1985 | Fassauer ................... 119/57.1 |
| 4,651,679 A | 3/1987 | Fassauer |
| 4,660,508 A * | 4/1987 | Kleinsasser et al. ....... 119/51.5 |
| 4,840,143 A | 6/1989 | Simon |
| 4,947,798 A * | 8/1990 | De Wispelaere ............... 119/53 |
| 5,010,849 A * | 4/1991 | Kleinsasser ................... 119/53 |
| 5,230,300 A | 7/1993 | Mezhinsky |
| 5,255,632 A * | 10/1993 | Thomas et al. ............ 119/51.5 |
| 5,263,437 A | 11/1993 | Murphrey |
| D351,261 S | 10/1994 | Woo |
| 5,482,006 A | 1/1996 | von Taschitzki |
| 5,595,139 A | 1/1997 | Hofer et al. |
| 5,857,425 A * | 1/1999 | Rahm ........................ 119/52.1 |
| 5,992,349 A | 11/1999 | Sachs |
| 6,135,056 A | 10/2000 | Kuo |
| 6,286,330 B1 * | 9/2001 | Kopf ............................ 62/314 |
| 6,401,657 B1 | 6/2002 | Krishnamurthy |
| 6,526,913 B2 * | 3/2003 | Bondarenko et al. ...... 119/53.5 |

* cited by examiner

*Primary Examiner*—Peter M. Poon
*Assistant Examiner*—Bethany L. Griles
(74) *Attorney, Agent, or Firm*—Locke Liddell & Sapp LLP

(57) ABSTRACT

A pet feeder for dispensing a supply of pet food includes a food dish and a food storage reservoir. The food storage reservoir is disposed adjacent the food dish and is adapted for holding a supply of the food. A top wall and a floor define the reservoir. The food dish is defined by a sidewall and a floor and has an open top to allow pets access to the food dish. The reservoir floor and the food dish floor form a continuous and downwardly sloping floor to gravitally direct pet food from the storage reservoir into the food dish. An agitator is disposed inside the reservoir. The agitator includes an arm secured to a disc for stirring the food to reduce food stagnation inside said reservoir. A food level sensor is further included in the reservoir to alert the user when the food level in the reservoir is empty or is approaching empty.

15 Claims, 4 Drawing Sheets

PET FEEDER

TECHNICAL FIELD OF THE INVENTION

This invention relates to a pet feeder, and more particularly, this invention relates to a gravity fed pet feeder having an agitator to reduce pet food stagnation while the food is being dispensed from a food storage reservoir into a food dish.

BACKGROUND OF THE INVENTION

Various gravity fed pet feeders exist to continuously dispense pet food. These devices are often used by pet owners who have irregular schedules where it is difficult to feed their pets at designated time intervals or by owners who simply desire to maintain a fresh and constant supply of pet food available for their pets.

Many gravity fed pet feeders are often heavy and bulky and require a large area to use and store. More importantly, pet food in these devices tends to stagnate or clog inside the feeder; thus, pets are often deprived of food until the pet owner returns and can manually "unclog" the food. This condition can be unhealthy and life-threatening if the pet if it is deprived of food for extended periods of time.

There is a need to provide a gravity fed pet feeder so as to provide a continuous supply of pet food that minimizes clogging inside the feeder while also requiring a minimal amount of space.

SUMMARY OF THE INVENTION

The present invention relates to a pet feeder wherein pet food gravitally feeds from a food storage reservoir into a food dish with minimal food stagnation. The food dish resembles a traditional style food bowl so as to be easily recognized by a pet. The reservoir floor and the food dish floor form a continuous and downwardly sloping floor extending from the rear of the food storage reservoir to the front portion of the food dish. This configuration facilitates the flow of new food into the dish to replace food consumed by the pet.

In addition, the present invention includes an agitator to reduce food stagnation inside the food storage reservoir. The agitator attaches to an electric motor in order to turn the agitator at slow speeds. Preferably, the agitator contains an arm secured to a disc member to sweep the food storage reservoir floor.

A food level sensor is disposed inside the food storage reservoir and alerts the user of a low food level condition. The food level sensor includes a limit switch operable between a closed position and an open position to indicate whether the food storage area is empty.

During use, the reservoir is filled with pet food. Food gravitally feeds downward along the sloped floor into the food dish until the dish is full. As the pet consumes food from the dish, a fresh supply of food gravitally feeds from the reservoir to replenish the food supply in the dish. The agitator is turned at periodic intervals to stir the food and to reduce food stagnation inside the storage reservoir. When food is depleted from the food storage reservoir, the sensor will indicate a low food level condition. A signal will be sent to a microcontroller to activate a warning light to alert the user that the food supply inside the reservoir should be replenished.

BRIEF DESCRIPTION OF THE DRAWINGS

For a more complete understanding of the invention and for further advantages thereof, reference is now made to the following Description of the Preferred Embodiments taken in conjunction with the accompanying Drawings in which.

DESCRIPTION OF THE PREFERRED EMBODIMENTS

Figure 1:
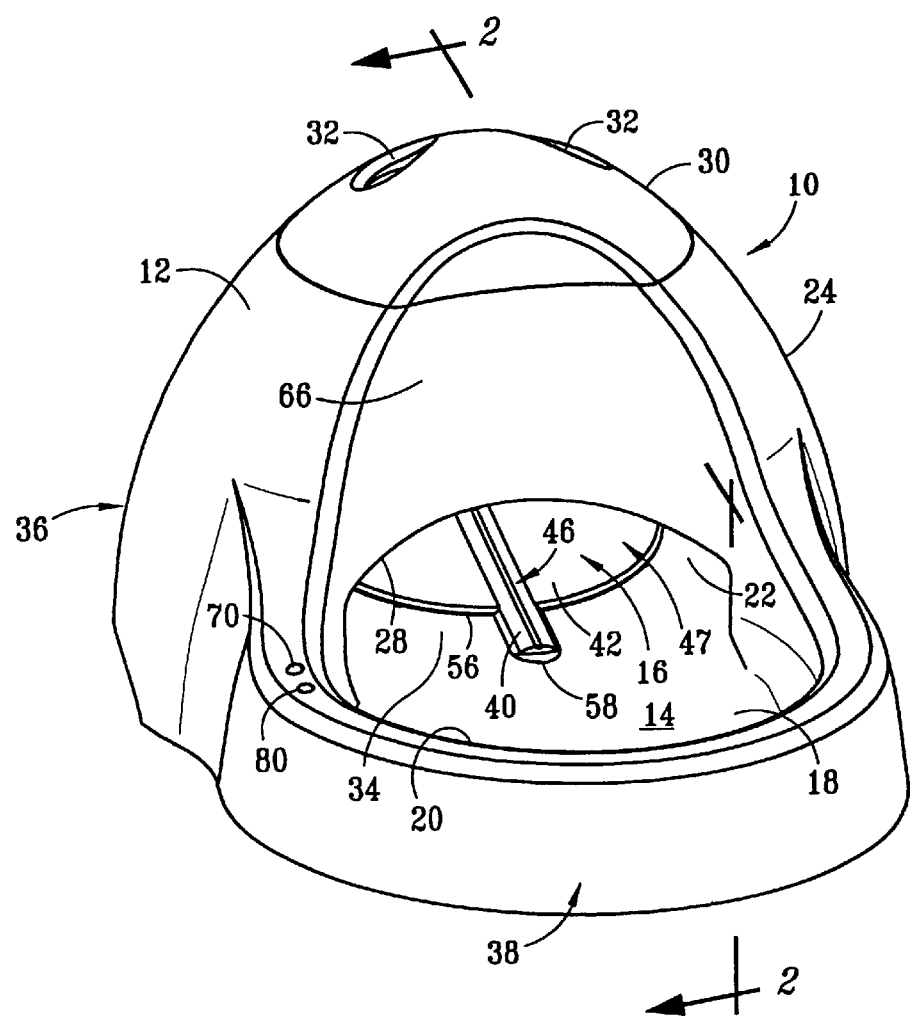
FIG. 1 is a front perspective view of the pet feeder.

Referring to FIG. 1, pet feeding apparatus 10 comprises a food storage reservoir 12, a food dish 14 and an agitator 16. Pet food is stored inside reservoir 12 and gravitally feeds into food dish 14. In order to reduce food stagnation inside reservoir 12, agitator 16 is mounted inside food storage reservoir and actuates at periodic intervals to agitate the pet food.

Figure 3:
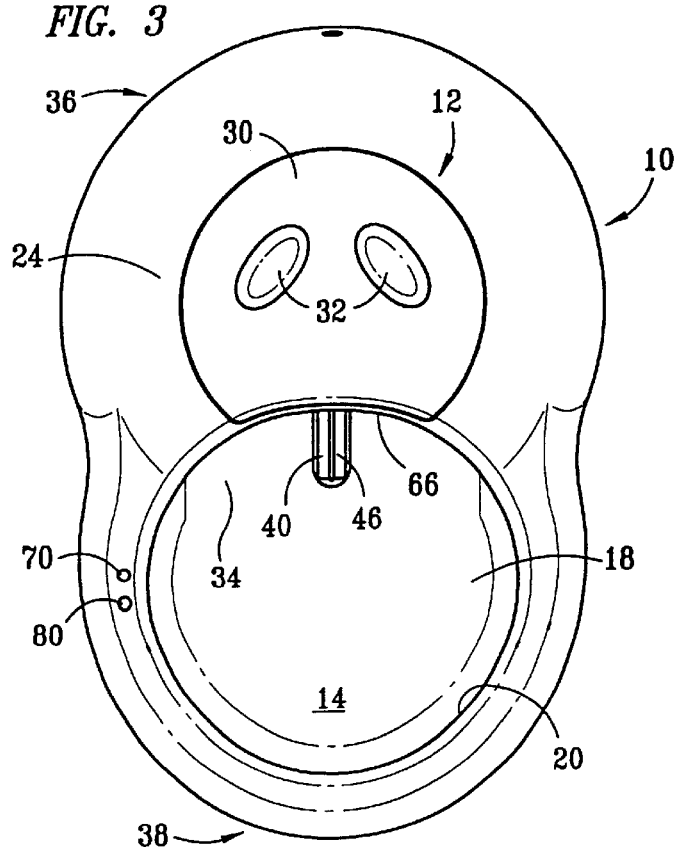
FIG. 3 is a top plan view of the pet feeder.

Food dish 14 is defined by a floor 18, a sidewall 20 and contains an open top to resemble a traditional pet food bowl. A floor 22 and a top wall 24 define food storage reservoir 12. As best seen in FIG. 3, reservoir 12 is generally circular in shape to prevent food from stagnating in corner areas. Food is inserted inside reservoir 12 through top opening 26 (FIG. 4) and exits reservoir 12 through opening 28. Top opening 26 can be covered by a lid 30 to enclose the reservoir from pets. Lid 30 contains grips 32 to permit easily removal.

Figure 2:
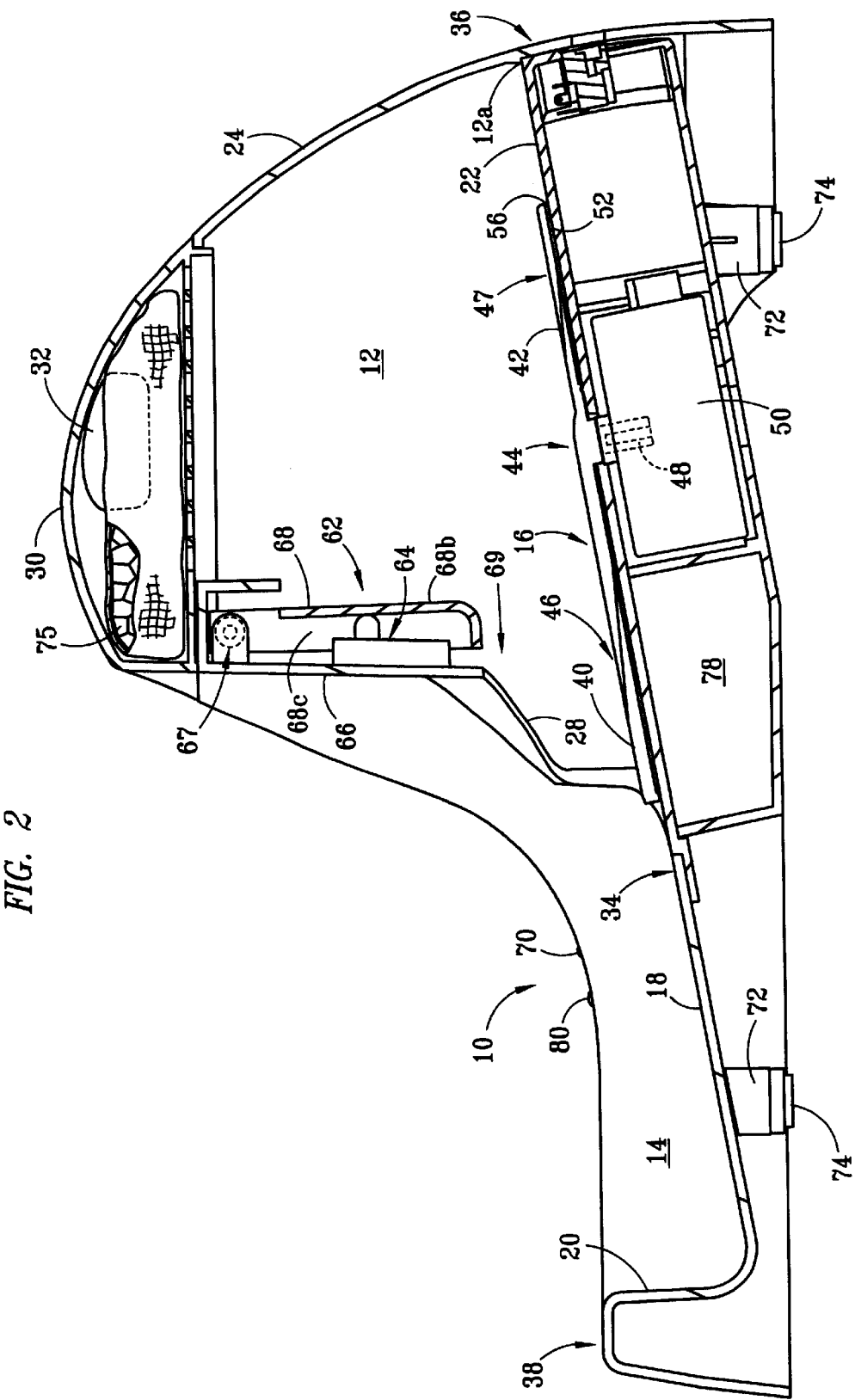
FIG. 2 is a section view of the present feeder taken along the line 2—2 of FIG. 1.

Referring to FIG. 2, reservoir floor 22 and dish floor 18 form a continuous and downwardly sloped floor 34. Floor 34 is angled such that floor 34 is higher at feeder rear end 36 than at feeder forward end 38. Floor 34 is preferably inclined approximately 10 degrees. This incline helps to prevent pet food from stagnating inside reservoir 12. Furthermore, this incline angle significantly reduces the likelihood that excessive amounts of pet food will exit reservoir 12 and potentially overfill or spill from food dish 14. This configuration allows pet food to gravitally feed from reservoir 12 into dish 14 to provide a constant supply of food for the pet.

Figure 5:
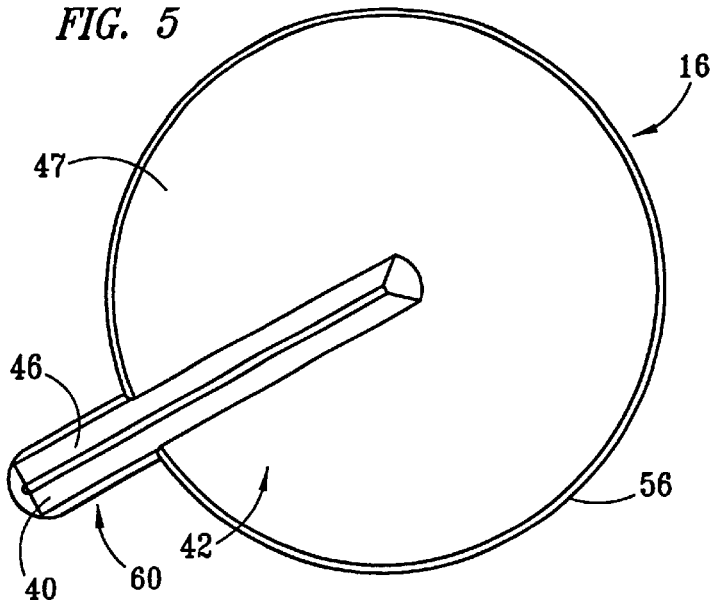
FIG. 5 is a top plan view of the agitator.

Referring to FIGS. 2 and 5–7, agitator 16 is mounted inside reservoir 12 and includes an arm 40 secured to a disc member 42. Disc member 42 is preferably circular in shape and centrally disposed on reservoir floor 22. Arm 40 extends outwardly from disc center portion 44 toward reservoir edge 12a to prevent food from accumulating around the edges 12a of reservoir 12. As seen in FIGS. 1 and 5, arm top surface 46 protrudes upward and slightly above disc top surface 47. This configuration better agitates food inside reservoir 12. Alternatively, arm 40 can disposed inside reservoir 12 without disc member 42. An agitator hub 48 secures agitator to a motor 50 (FIG. 2) to turn agitator 16. Motor 50 is programmed to operate at periodic intervals to agitate the food inside reservoir 12. It should be realized by one of ordinary skill that other devices can be used to turn agitator 16, such as a manual wind-up crank mechanism, by way of example.

Figure 6:
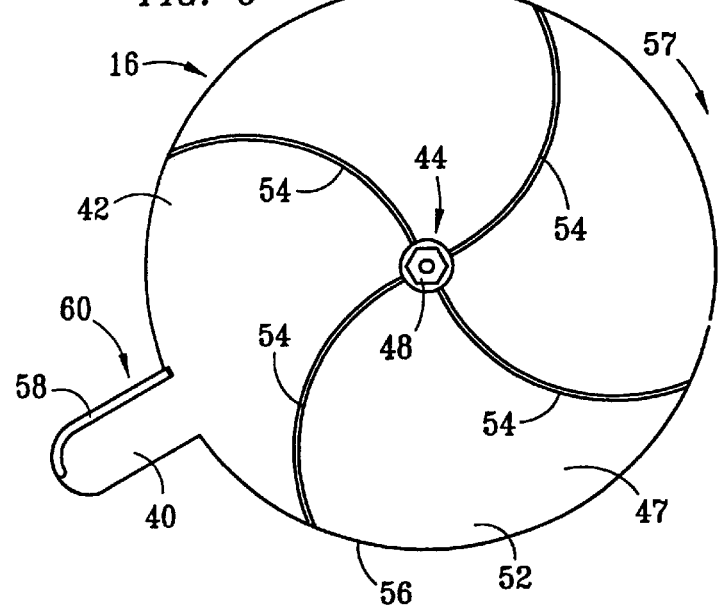
FIG. 6 is a bottom plan view of the agitator.
Figure 7:
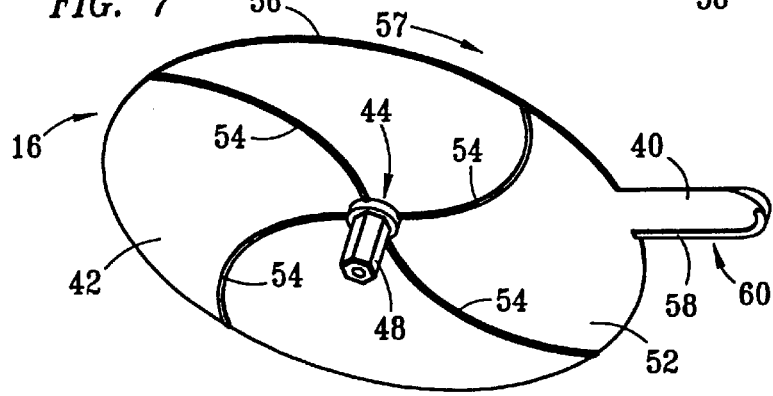
FIG. 7 is a bottom perspective view of the agitator.

Referring to FIGS. 6 and 7, disc bottom surface 52 contains at least one rib 54 protruding outward from bottom surface 52 to communicate with floor 22. This configuration permits rib 54 to slidably engages floor 22 so as to prevent food particles, crumbs or other debris from collecting between disc 42 and reservoir floor 22. Rib 54 is outwardly curved between disc center portion 44 and disc periphery 56.

Thus, as agitator 16 turns in direction 57, the food crumbs and other debris are pushed outwardly by rib 54 and are positioned along disc periphery 56. Likewise, arm 40 contains a rib 58 disposed along forward edge 60 to sweep floor 22 so as to prevent debris from accumulating beneath arm 40. By reducing the debris trapped between bottom surface 52 and floor 22, operation of agitator becomes more reliable.

Agitator 16 is preferably fabricated from plastic material; however, it should be realized by one of ordinary skill that any material, such as a metal, could be used so long as it provides sufficient strength to agitate the animal food inside reservoir 12.

Figure 4:
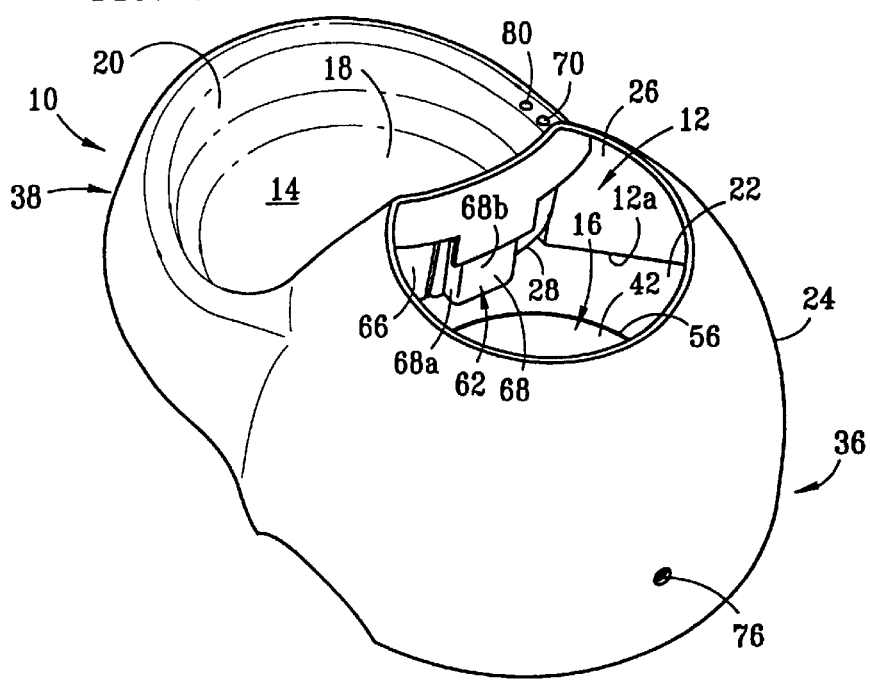
FIG. 4 is a rear perspective view of the pet feeder with the reservoir lid removed.

Referring to FIGS. 2 and 4, a food level sensor 62 is illustrated. Sensor 62 senses a low food level position, when reservoir 12 is empty or approaching empty, and a full food level position, when reservoir 12 is full or substantially full of pet food. Sensor 62 includes a limit switch 64 operable between a closed position and an open position. When the sensor senses a low food level position, the limit switch is closed. Likewise, when the sensor senses a full food level position, the limit switch is open.

Preferably, limit switch 64 is a spring type switch disposed on forward wall 66. Furthermore, a paddle arm 68 can be pivotally mounted adjacent limit switch 64 on paddle pivot support 67. Paddle arm 68 sidewalls 68a, 68b and 68c, enclose limit switch 64 to prevent contact with pet food inside reservoir 12 while also preventing pets or other objects from striking and possibly damaging limit switch 64.

Limit switch 64, in conjunction with paddle 68, are used to determine the full food level condition or the low food level condition inside reservoir 12. While reservoir 12 is full of pet food, food acts on paddle 68 to push the paddle toward forward wall 66 in the direction of arrow 69. This movement compresses and opens limit switch 64 to indicate that reservoir 12 is in the full food level position (i.e., reservoir is full of pet food). When sensor 62 is in the low food level condition, the level of food inside reservoir 12 drops below paddle 68 and food no longer pushes paddle 68 toward forward wall 66. As a result, paddle 68 moves away from forward wall 66 and limit switch 64 is closed. When closed, a warning light 80 (best seen in FIG. 1), or any other type of indicator, such as a buzzer, indicates to the pet owner that the reservoir is empty or is approaching empty.

Other types of food level sensors may include photodetectors or infra-red, or proximity (i.e., sonar, ultrasonic, etc.) sensors, for example.

Referring to FIG. 2, feeder 10 is supported above a surface (not shown) by legs 72. Each leg 72 contains a rubber support 74 to provide sufficient frictional action with the surface to prevent feeder 10 from sliding when animals are eating.

In order to maintain food freshness and to reduce odors produced by the pet food, a charcoal filled dry pouch 75 may be mounted inside reservoir 12.

Household electricity can be used to operate sensor 62 and motor 50 by attaching a power cord (not shown) into plug 76 (FIG. 4). Alternatively, batteries can be placed in a battery compartment 78 (FIG. 2) to provide power to feeder 10. When voltage from the battery or power source drops below 4.7 volts, light 70 will blink.

Although the preferred embodiments of the present invention have been illustrated in the accompanying drawings and described in the foregoing Description of the Preferred Embodiments, it will be understood that the invention is not limited to the embodiments disclosed but is capable of numerous rearrangements, modifications, and substitutions of parts and elements without departing from the sprit of the invention.

We claim:

1. A pet feeder for dispensing a supply of pet food, the feeder comprising:

a food dish and a food storage reservoir;

said food storage reservoir disposed adjacent said food dish and adapted for holding a supply of the food, said reservoir defined by a top wall and a floor;

said food dish defined by a sidewall and a floor and having an open top to allow pets access to said food dish;

said reservoir floor and said food dish floor gravitally direct the pet food into said food dish as the food moves from said food storage reservoir to said food dish;

an agitator disposed in said reservoir, said agitator including an arm for stirring the food to reduce food stagnation inside said reservoir;

said agitator includes a disc wherein said arm is secured to said disc; and said disc includes a lower surface, said lower surface being mounted adjacent said reservoir floor, said lower surface further having a rib to slidably engage said reservoir floor to prevent pet food particulate buildup between said disc lower surface and said reservoir floor.

2. The pet feeder of claim 1 wherein said disk includes a center portion and an outer periphery wherein said rib is curved from said center portion to said outer periphery.

3. The pet feeder of claim 1 wherein said arm includes a lower surface, said lower surface having an arm rib to slidably engage said reservoir floor to prevent pet food particulate buildup between said arm lower surface and said reservoir floor.

4. The pet feeder of claim 1 wherein said food storage reservoir contains a food level sensor.

5. The pet feeder of claim 4 wherein said food level sensor senses a low food level position and a full food level position, said sensor including a limit switch operable between a closed position and an open position such that when said sensor senses said low food level position, said limit switch is in said closed position, and such that when said sensor senses said full food level position, said limit switch is in said open position.

6. The pet feeder of claim 5 wherein said limit switch includes a paddle for contacting the food for switching said limit switch to the closed or open position.

7. The pet feeder of claim 1 wherein said reservoir floor and said food dish floor are downwardly sloped from said reservoir to said food dish.

8. The pet feeder of claim 1 further including a charcoal pack disposed in said reservoir.

9. A pet feeder for dispensing a supply of pet food, the feeder comprising:

a food dish and a food storage reservoir, said reservoir defined by a top wall and a floor and said food dish defined by a sidewall and a floor, said reservoir disposed adjacent said food dish wherein pet food gravitally feeds into said food dish from said food storage reservoir;

an agitator disposed in said reservoir, said agitator including an arm for stirring the food to reduce food stagnation inside said reservoir;

said agitator includes a disc wherein said arm is secured to said disc; and said disc includes a lower surface, said lower surface being mounted adjacent said reservoir floor, said lower surface further having a rib to slidably engage said reservoir floor to prevent pet food particulate buildup between said disc lower surface and said reservoir floor.

10. The pet feeder of claim 9 wherein said disk includes a center portion and an outer periphery wherein said rib is curved from said center portion to said outer periphery.

11. The pet feeder of claim 9 wherein said arm includes a lower surface, said lower surface having an arm rib to slidably engage said reservoir floor to prevent pet food particulate buildup between said arm lower surface and said reservoir floor.

12. The pet feeder of claim 9 wherein said food storage reservoir contains a food level sensor.

13. The pet feeder of claim 12 wherein said food level sensor senses a low food level position and a full food level position, said sensor including a limit switch operable between a closed position and an open position such that when said sensor senses said low food level position, said limit switch is in said closed position, and such that when said sensor senses said full food level position, said limit switch is in said open position.

14. The pet feeder of claim 13 wherein said limit switch includes a paddle for contacting the food for switching said limit switch to the closed or open position.

15. The pet feeder of claim 9 further including a charcoal pack disposed in said reservoir.

* * * * *